United States Patent
Yang et al.

(10) Patent No.: US 12,048,880 B2
(45) Date of Patent: Jul. 30, 2024

(54) METHOD AND APPARATUS FOR DISPLAYING INTERACTIVE ITEM, TERMINAL, AND STORAGE MEDIUM

(71) Applicant: Tencent Technology (Shenzhen) Company Limited, Guangdong (CN)

(72) Inventors: Jinhao Yang, Guangdong (CN); Lingyun Lin, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 258 days.

(21) Appl. No.: 17/703,753

(22) Filed: Mar. 24, 2022

(65) Prior Publication Data

US 2022/0212107 A1 Jul. 7, 2022

Related U.S. Application Data

(63) Continuation of application No. PCT/CN2020/129861, filed on Nov. 18, 2020.

(30) Foreign Application Priority Data

Mar. 17, 2020 (CN) .......................... 202010187990.X

(51) Int. Cl.
 *A63F 13/5372* (2014.01)
 *A63F 13/5375* (2014.01)
 *A63F 13/55* (2014.01)

(52) U.S. Cl.
 CPC ...... *A63F 13/5372* (2014.09); *A63F 13/5375* (2014.09); *A63F 13/55* (2014.09); *A63F 2300/8076* (2013.01)

(58) Field of Classification Search
 None
 See application file for complete search history.

(56) References Cited

U.S. PATENT DOCUMENTS

| 7,119,817 | B1   | 10/2006 | Kawakami |
| 11,766,613 | B2 * | 9/2023 | Yang .................... A63F 13/5255 463/33 |

(Continued)

FOREIGN PATENT DOCUMENTS

| CN | 101681524 A | 3/2010 |
| CN | 101908232 A | 12/2010 |
| CN | 103489214 A | 1/2014 |
| CN | 105126343 A | 12/2015 |
| CN | 109550247 A | 4/2019 |
| CN | 111408133 A | 7/2020 |

(Continued)

OTHER PUBLICATIONS

Notice of Reasons for Refusal issued on Japanese application 2022-532846, dated Nov. 22, 2023, 3 pages.

(Continued)

*Primary Examiner* — Ronald Laneau
(74) *Attorney, Agent, or Firm* — Crowell & Moring LLP

(57) ABSTRACT

A method and a device for displaying an interactive item are disclosed. In an example method, under a condition that a perspective item is in an assembled state, when detecting that an occluded interactive item is included within a viewing angle range of a controlled virtual object in a virtual scene and the occluded interactive item meets a perspective condition, the occluded interactive item may be displayed in the virtual scene in a perspective manner, so that the controlled virtual object may see the occluded interactive item through an obstacle, thereby extending a capability for the controlled virtual object to obtain information, and rendering a living environment of virtual objects with different interactive items more balanced. The disclosed implementations improve attractiveness of a shooting game by enriching interactivity.

20 Claims, 6 Drawing Sheets

(56) References Cited

U.S. PATENT DOCUMENTS

| | | | |
|---|---|---|---|
| 2002/0177481 A1 | 11/2002 | Kitsutaka | |
| 2009/0027388 A1 | 1/2009 | Furuhashi | |
| 2011/0306417 A1 | 12/2011 | Sheblak | |
| 2012/0302341 A1 | 11/2012 | Abe | |
| 2015/0113483 A1* | 4/2015 | Van Der Westhuizen | G06F 3/04842 715/850 |
| 2019/0237044 A1 | 8/2019 | Day et al. | |
| 2022/0036648 A1* | 2/2022 | Wang | G06F 3/04815 |
| 2023/0256338 A1* | 8/2023 | Cai | A63F 13/56 463/32 |
| 2023/0326174 A1* | 10/2023 | Chen | G06T 5/77 382/167 |

FOREIGN PATENT DOCUMENTS

| | | |
|---|---|---|
| JP | 2002-63591 | 2/2002 |
| JP | 2009-31947 | 2/2009 |
| JP | 2017-55897 A | 3/2017 |

OTHER PUBLICATIONS

"Unity Shader—X-Ray"; puppet_master, downloaded from the Internet on Mar. 24, 2022 at https://www.cxymm.net/article/puppet_master/73478905; 39 pages.

https://new.qq.com/omn/20200104/20200104A01R0A00.html; Jan. 4, 2020.

International Search Report and Written Opinion mailed Feb. 8, 2021 for International Applicatian No. PCT/CN2020/129816.

Office Action issued Feb. 20, 2021 for Chinese Application No. 20200187990.X; nine pages.

Office Action issued Apr. 9, 2021 for Chinese Agpiication No. 202010187990.X; nine pages.

Office Action issued Dec. 2, 2020 for Chinese Application No. 202010187990.X; 12 pages.

Office Action issued for application No. JP 2022-532846 dated Jun. 8, 2023, 4p, in Japanese language.

English language translation of Office Action for application No. JP 2022-532846 dated Jun. 8, 2023, 4p.

Kakusei, "CoD:B03 active camouflage. Effect and details of Engineer", game brochure found on the internet @ https://kakusei-fps.com/cod/cod-bo3/engineer-break-down/, Dec. 27, 2015, 10p.

Okugame, "Call of Duty Mobile—All classes of the [COD] broker!—Attention is drawn to the beginner's recommendation", game brochure found on the internet @ https://70okugame.com/callofduty/class/13/, Jan. 22, 2020, 3p.

Notice of Preliminary Rejection issued on Korean Application 10-2022-701956 dated February 15, 2024, 6 pages.

English Machine Translation of Notice of Preliminary Rejection.2. Block Ops 2: X-Ray Sniping(Jun. 6, 2012) youtube.com/watch?v=vK4beFFIZ54.

Halo 4 Flood (Infection Mode Review Nov. 12, 2012.

* cited by examiner

METHOD AND APPARATUS FOR DISPLAYING INTERACTIVE ITEM, TERMINAL, AND STORAGE MEDIUM

RELATED APPLICATION

This application is a continuation application of International PCT Patent Application No. PCT/CN2020/129816 filed on Nov. 18, 2020, which is based on and claims priority to Chinese Patent Application No. 202010187990.X filed on Mar. 17, 2020, both entitled "METHOD AND APPARATUS FOR DISPLAYING INTERACTIVE ITEM, TERMINAL, AND STORAGE MEDIUM." Both of these prior patent applications are incorporated herein by reference in their entireties.

FIELD OF THE TECHNOLOGY

This application relates to the field of multimedia technologies, and in particular, to a method and an apparatus for displaying an interactive item, a terminal, and a storage medium.

BACKGROUND OF THE DISCLOSURE

With the development of multimedia technologies and the diversity of terminal functions, increasingly more types of games can be played on a terminal. A shooting game is a type of popular game. A terminal may display a virtual scene in an interface, and display a virtual object in the virtual scene. The virtual object may control an interactive item for fighting against other virtual objects.

Currently, there are generally various types of interactive items in the shooting game, such as a machine gun, a grenade, a gunship, and an armed helicopter. Once a user obtains a specific interactive item by operating a virtual object, the user hides the interactive item in a hidden place, which causes other virtual objects to face unknown and potential threats at any time in a battle, that is, a living environment of the virtual objects is extremely unbalanced. The shooting game provided by the current terminal device has relatively low attractiveness, a single interaction manner, and a poor interaction effect.

SUMMARY

Embodiments of this application provide a method and an apparatus for displaying an interactive item, a terminal, and a storage medium. The technical solutions are as follows:

In an aspect, a method for displaying an interactive item is provided, applicable to a terminal, the method including:
  when a perspective item is in an assembled state, detecting whether an occluded interactive item is included within a viewing angle range of a controlled virtual object in a virtual scene, the perspective item being used for displaying the occluded interactive item in a perspective manner;
  when the occluded interactive item is included within the viewing angle range, detecting whether the occluded interactive item meets a perspective condition, the perspective condition being used for representing a condition that the occluded interactive item is visible relative to the perspective item; and
  when the occluded interactive item meets the perspective condition, displaying the occluded interactive item in a perspective manner in the virtual scene.

In an example implementation, the displaying the occluded interactive item in a perspective manner in the virtual scene includes:
  displaying an outline of the occluded interactive item on a target object of the virtual scene, the target object being an object occluding the interactive item.

In an example implementation, the displaying an outline of the occluded interactive item includes:
  in at least one component of a prefab of the occluded interactive item, determining a target component whose material does not belong to a semi-transparent material; and
  setting a display state of the target component to an occlusion culling state, and setting a rendering manner of the target component to allow a perspective effect.

In an example implementation, the displaying the occluded interactive item in a perspective manner in the virtual scene includes:
  on a target object of the virtual scene, highlighting a mapping region in which the occluded interactive item is mapped to the target object, the target object being an object occluding the interactive item.

In an example implementation, the perspective condition is that at least one component of a prefab of the occluded interactive item includes a target component whose material does not belongs to a semi-transparent material.

In an example implementation, the detecting whether an occluded interactive item is included within a viewing angle range of a controlled virtual object in a virtual scene includes:
  detecting whether an interactive item is included within the viewing angle range;
  when the interactive item is included within the viewing angle range, obtaining a distance between the controlled virtual object and the interactive item;
  when the distance is less than a distance threshold, detecting whether a target object is included between the controlled virtual object and the interactive item, the target object being an object occluding the interactive item; and
  when the target object is included between the controlled virtual object and the interactive item, determining that the occluded interactive item is included within the viewing angle range; or otherwise, determining that the occluded interactive item is not included within the viewing angle range.

In an example implementation, after the displaying the occluded interactive item in a perspective manner in the virtual scene, the method further includes:
  when an interactive attribute value of the controlled virtual object or the occluded interactive item is lower than an attribute threshold, canceling display of the occluded interactive item in the virtual scene.

In an example implementation, the displaying an outline of the occluded interactive item on a target object of the virtual scene further includes:
  adding a crispening special effect for the occluded interactive item on the target object of the virtual scene according to the outline of the occluded interactive item, the crispening special effect being corresponding to at least one display parameter of an edge color, a crispening width, luminous intensity, a luminous range, and a crispening type. The term crispening represents highlighting of edges, contour, or outline. The term crispening and highlighting are used interchangeably.

In an example, an apparatus for displaying an interactive item is provided, the apparatus including:

a detection module, configured to, when a perspective item is in an assembled state, detect whether an occluded interactive item is included within a viewing angle range of a controlled virtual object in a virtual scene, the perspective item being used for displaying the occluded interactive item in a perspective manner, the detection module being further configured to, when the occluded interactive item is included within the viewing angle range, detect whether the occluded interactive item meets a perspective condition, the perspective condition being used for representing a condition that the occluded interactive item is visible relative to the perspective item; and a perspective display module, configured to, when the occluded interactive item meets the perspective condition, display the occluded interactive item in a perspective manner in the virtual scene.

In an example implementation, the perspective display module includes:

an outline display unit, configured to display an outline of the occluded interactive item on a target object of the virtual scene, the target object being an object occluding the interactive item.

In an example implementation, the outline display unit is configured to:

in at least one component of a prefab of the occluded interactive item, determine a target component whose material does not belong to a semi-transparent material; and set a display state of the target component to an occlusion culling state, and set a rendering manner of the target component to allow a perspective effect.

In an example implementation, the perspective display module is configured to:

on a target object of the virtual scene, highlight a mapping region in which the occluded interactive item is mapped to the target object, the target object being an object occluding the interactive item.

In an example implementation, the perspective condition is that at least one component of a prefab of the occluded interactive item includes a target component whose material does not belongs to a semi-transparent material.

In an example implementation, the detection module is configured to:

detect whether an interactive item is included within the viewing angle range;

when the interactive item is included within the viewing angle range, obtain a distance between the controlled virtual object and the interactive item;

when the distance is less than a distance threshold, detect whether a target object is included between the controlled virtual object and the interactive item, the target object being an object occluding the interactive item; and when the target object is included between the controlled virtual object and the interactive item, determine that the occluded interactive item is included within the viewing angle range; or otherwise, determine that the occluded interactive item is not included within the viewing angle range.

In an example implementation, the apparatus further includes:

a display canceling module, configured to, when an interactive attribute value of the controlled virtual object or the occluded interactive item is lower than an attribute threshold, cancel display of the occluded interactive item in the virtual scene.

In an example implementation, the outline display unit is further configured to:

add a crispening special effect for the occluded interactive item on the target object of the virtual scene according to the outline of the occluded interactive item, the crispening special effect being corresponding to at least one display parameter of an edge color, a crispening width, luminous intensity, a luminous range, and a crispening type.

In an example, a terminal is provided, including one or more processors and one or more memories, the one or more memories storing at least one piece of program code, the at least one piece of program code being loaded and executed by the one or more processors to implement the operations performed in the method for displaying an interactive item according to any one of the foregoing possible implementations.

In an example, a storage medium is provided, storing at least one piece of program code, the at least one piece of program code being loaded and executed by a processor to implement the operations performed in the method for displaying an interactive item according to any one of the foregoing possible implementations.

In an example, according to an aspect of this application, a computer program product or a computer program is provided. The computer program product or the computer program includes computer instructions, and the computer instructions are stored in a computer-readable storage medium. A processor of a computer device reads the computer instructions from the computer-readable storage medium, and executes the computer instructions, so that the computer device performs the method for displaying an interactive item provided in the possible implementations in the foregoing aspects.

The technical solutions provided in the embodiments of this application achieve at least the following beneficial effects:

Under a condition that a perspective item is in an assembled state, in a case of detecting that an occluded interactive item is included within a viewing angle range of a controlled virtual object in a virtual scene, and the occluded interactive item meets a perspective condition, the occluded interactive item may be displayed in the virtual scene in a perspective manner, so that the controlled virtual object may see the occluded interactive item through an obstacle, which extends a capability that the controlled virtual object obtains information, and makes a living environment of virtual objects with different interactive items more balanced, thereby improving attractiveness of a shooting game provided by the terminal, enriching an interaction manner of the shooting game, and optimizing an interaction effect of the shooting game. In addition, a player may determine a threatening interactive item that may exist in a virtual environment, and adopts a corresponding battle strategy based on a position of the interactive item, to enable the player to control the virtual object to participate in a battle, so that an item usage rate of the controlled virtual object is improved, thereby effectively controlling a duration of a single game, and further reducing processing pressure of a server.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person of ordinary skill in the art may still derive other accompanying drawings from these accompanying drawings without creative efforts.

DESCRIPTION OF EMBODIMENTS

Figure 1:
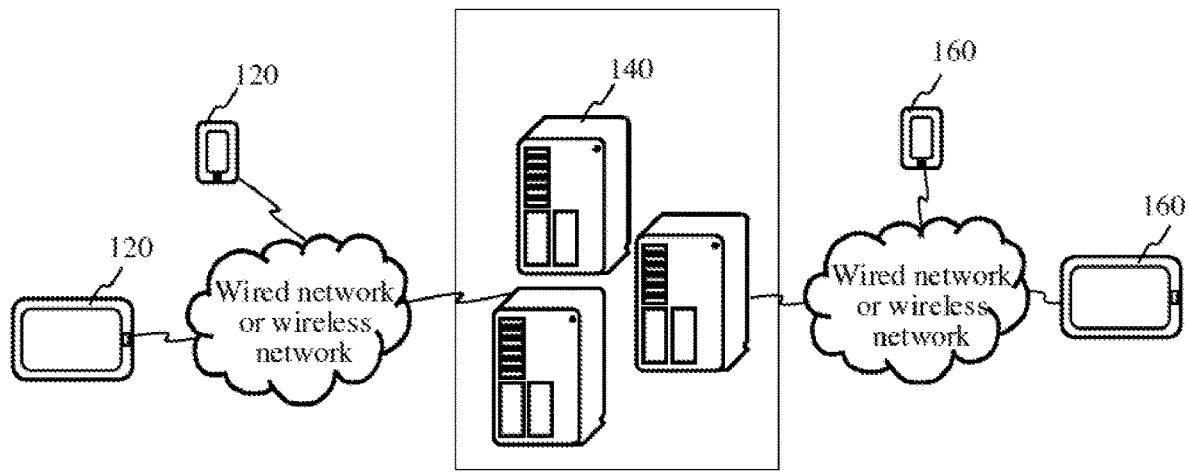
FIG. 1 is a schematic diagram of an implementation environment of a method for displaying an interactive item according to an embodiment of this application.

To make objectives, technical solutions, and advantages of this application clearer, the following further describes implementations of this application in detail with reference to the accompanying drawings.

The terms "first", "second", and the like in this application are used for distinguishing between same items or similar items of which effects and functions are basically the same. The "first", "second", and "nth" do not have a dependency relationship in logic or time sequence, and a quantity and an execution order thereof are not limited.

The term "at least one" in this application means one or more and "a plurality of" means two or more. For example, a plurality of first positions means two or more first positions.

Terms involved in this application are explained below.

Virtual scene: a virtual scene displayed (or provided) when an application is run on a terminal. The virtual scene may be a simulation environment of a real world, or may be a semi-simulation and semi-fiction virtual environment, or may be a pure fiction virtual environment. The virtual scene may be any one of a two-dimensional (2D) virtual scene, a 2.5-dimensional virtual scene, or a three-dimensional (3D) virtual scene, and the dimension of the virtual scene is not limited in this embodiment of this application. For example, the virtual scene may include the sky, the land, the ocean, or the like. The land may include environmental elements such as the desert and a city. The user may control a virtual object to move in the virtual scene.

Virtual object: a movable object in a virtual scene. The movable object may be a virtual character, a virtual animal, a cartoon character, or the like, for example, a character, an animal, a plant, an oil drum, a wall, or a stone displayed in a virtual scene. The virtual object may be a virtual image for representing the user in the virtual scene. The virtual scene may include a plurality of virtual objects, and each virtual object has a shape and a volume in the virtual scene, and occupies some space in the virtual scene.

In some implementations, the virtual object may be a player character controlled through operations on a client, or may be an artificial intelligence (AI) set through training in a virtual scene battle, or may be a non-player character (NPC) set in virtual scene interaction. In some implementations, the virtual object may be a virtual character that competes in the virtual scene. In some implementations, a quantity of virtual objects participating in interaction in the virtual scene may be preset, or may be dynamically determined according to a quantity of clients participating in interaction.

For example, in a shooting game, the user may control the virtual object to fall freely, glide, parachute, or the like in the sky of the virtual scene, or run, jump, crawl, bend forward, or the like on the land, or swim, float, dive, or the like in the ocean. The user may alternatively control the virtual object to drive a virtual vehicle to move in the virtual scene. For example, the virtual vehicle may be a virtual car, a virtual aircraft, a virtual yacht, or the like. Herein, the foregoing scenes are merely used as an example for description, and this is not specifically limited in this embodiment of this application. The user may alternatively control the virtual object to perform interaction in manners such as battling with other virtual objects by using an interactive item. For example, the interactive items may be throwing virtual weapons such as a grenade, a cluster grenade, a sticky grenade, and a laser trip mine, or may be shooting virtual weapons such as a machine gun, a pistol, a rifle, and a sentry gun, or may be some summoning virtual soldiers (such as a mechanical zombie). A type of the interactive item is not specifically limited in this application.

A system architecture involved in this application is described below.

FIG. 1 is a schematic diagram of an implementation environment of a method for displaying an interactive item according to an embodiment of this application. Referring to FIG. 1, the implementation environment includes: a first terminal 120, a server 140, and a second terminal 160.

An application supporting a virtual scene is installed and run on the first terminal 120. The application may be any one of a first-person shooter (FPS) game, a third-person shooter (TPS) game, a multiplayer online battle arena (MOBA) game, a virtual reality (VR) application, a 3D map program, a military simulation program, or a multiplayer gunfight survival game. The first terminal 120 may be a terminal used by a first user, and the first user uses the first terminal 120 to operate a first virtual object in the virtual scene to perform a movement. The movement includes, but is not limited to, at least one of body posture adjustment, crawling, walking, running, cycling, jumping, driving, picking-up, shooting, attacking, and throwing. For example, the first virtual object is a first virtual character, such as a simulated character role or a cartoon character role.

The first terminal 120 and the second terminal 160 are connected to the server 140 through a wireless network or a wired network.

The server 140 may include at least one of one server, a plurality of servers, a cloud computing platform, or a virtualization center. The server 140 is configured to provide a backend service for an application supporting a virtual scene. In some implementations, the server 140 may be responsible for primary computing work, and the first terminal 120 and the second terminal 160 may be responsible for secondary computing work; or the server 140 is responsible for secondary computing work, and the first terminal 120 and the second terminal 160 are responsible for primary computing work; or the server 140, the first terminal 120, and the second terminal 160 perform collaborative computing by using a distributed computing architecture among each other.

An application supporting a virtual scene is installed and run on the second terminal 160. The application may be any one of an FPS game, a TPS game, a MOBA game, a VR application, a 3D map application, a military simulation program, or a multiplayer gunfight survival game. The second terminal 160 may be a terminal used by a second user, and the second user uses the second terminal 160 to operate a second virtual object in the virtual scene to perform a movement. The movement includes, but not limited to, at least one of body posture adjustment, crawling, walking, running, cycling, jumping, driving, picking-up, shooting, attacking, and throwing. For example, the second virtual object is a second virtual character, such as a simulated character role or a cartoon character role.

In some implementations, the first virtual object controlled by the first terminal 120 and the second virtual object controlled by the second terminal 160 are in a same virtual scene. In this case, the first virtual object may interact with the second virtual object in the virtual scene. In some embodiments, the first virtual object and the second virtual object may have a hostile relationship. For example, the first virtual object and the second virtual object may belong to different teams and organizations, and the virtual objects having a hostile relationship may perform interaction in a battle manner such as a manner of shooting at each other on land.

In an exemplary scenario, if the first virtual object and the second virtual object have a hostile relationship, the first terminal 120 controls the first virtual object to cast an interactive item on a position occluded by a specific target object in the virtual scene. In this case, if the second terminal 160 is assembled with a perspective item before a battle starts, after the battle starts, when the second terminal 160 controls the second virtual object to move in the virtual scene, if the occluded interactive item (such as the interactive item cast by the first virtual object) is included in a viewing angle range of the second virtual object, the second terminal 160 checks whether the occluded interactive item meets a perspective condition, and when the occluded interactive item meets the perspective condition, the second terminal displays the occluded interactive item in a perspective manner in the virtual scene, so that the second virtual object may observe the interactive item ambush by the first virtual object in the battle, and richer and more interesting interaction manners and more diverse interaction effects can be brought.

In some other embodiments, the first virtual object and the second virtual object may have a teammate relationship. For example, the first virtual character and the second virtual character may belong to the same team or the same organization, have a friend relationship, or have a temporary communication permission.

In some implementations, the applications installed on the first terminal 120 and the second terminal 160 are the same, or the applications installed on the two terminals are the same type of applications in different operating system platforms. The first terminal 120 may generally refer to one of a plurality of terminals, and the second terminal 160 may generally refer to one of a plurality of terminals. In this embodiment, only the first terminal 120 and the second terminal 160 are used as an example for description. Device types of the first terminal 120 and the second terminal 160 are the same or different. The device type includes a smartphone, a tablet computer, an ebook reader, a moving picture experts group audio layer III (MP3) player, a moving picture experts group audio layer IV (MP4) player, and a laptop portable computer, a tablet computer, or an in-vehicle terminal. For example, the first terminal 120 and the second terminal 160 may be smartphones, or other handheld portable game devices. The following embodiment is described by using an example that the terminal includes a smartphone.

A person skilled in the art may learn that, there may be more or fewer terminals. For example, there may be only one terminal, or there may be dozens of or hundreds of terminals or more. The quantity and the device type of the terminals are not limited in this embodiment of this application.

In an exemplary scenario, the foregoing implementation environment may be built in a blockchain system. The blockchain is a new application mode of computer technologies such as distributed data storage, point-to-point transmission, a consensus mechanism, and an encryption algorithm. The blockchain is essentially a decentralized database and is a string of data blocks generated through association by using a cryptographic method. Each data block includes information of a batch of network transactions, the information being used for verifying the validity of information of the data block (anti-counterfeiting) and generating a next data block.

In some embodiments, both the first terminal 120 and the second terminal 160 may be node devices on the blockchain system. Therefore, after controlling the interactive item through the application and generating interactive data each time, any node device may upload the interactive data to the blockchain system, to implement persistent storage on the blockchain system. Due to the immutability of the blockchain system, the storage of the interactive data has higher security.

Figure 2:
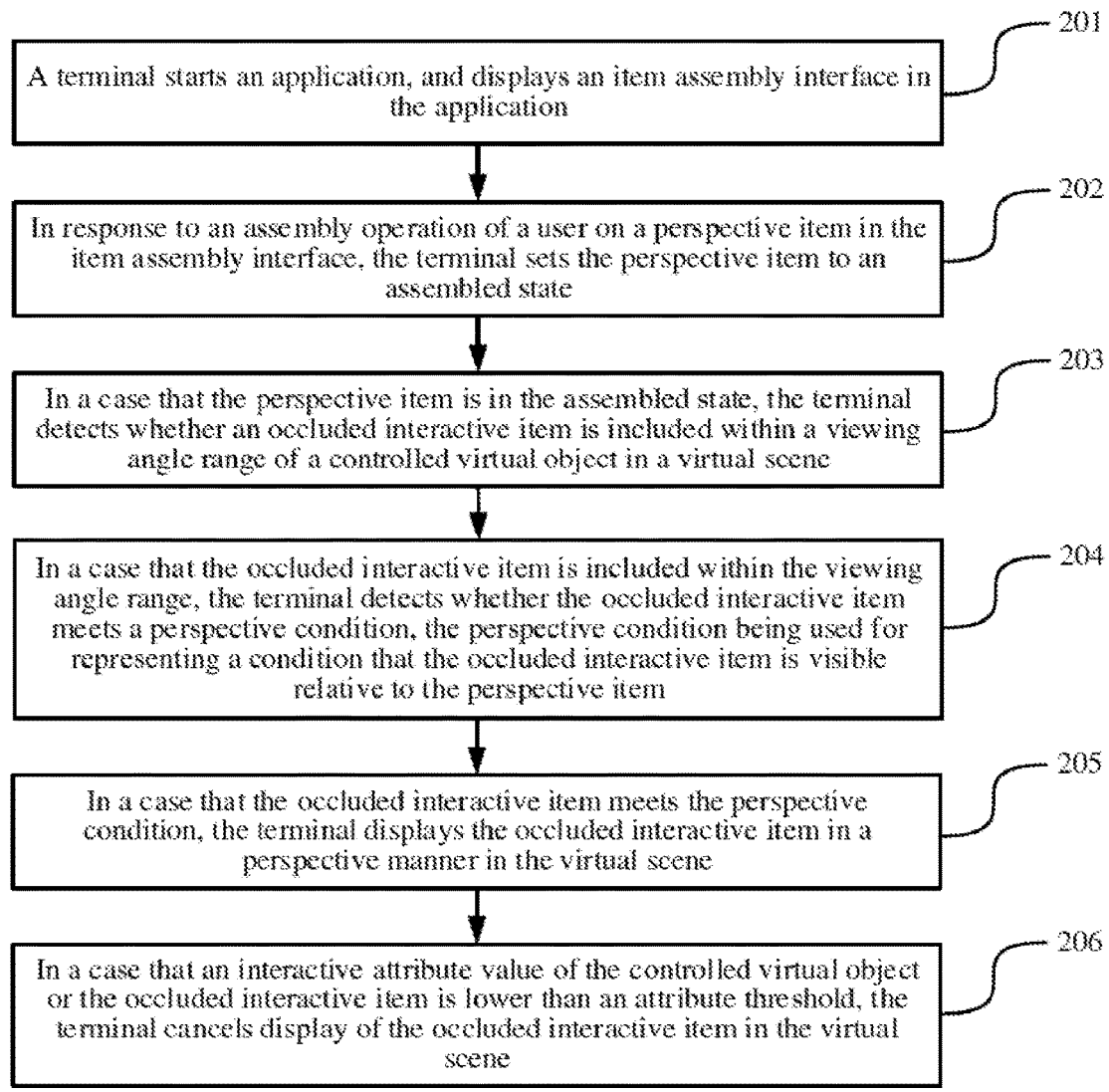
FIG. 2 is a flowchart of a method for displaying an interactive item according to an embodiment of this application.

FIG. 2 is a flowchart of a method for displaying an interactive item according to an embodiment of this application. Referring to FIG. 2, this embodiment is described by using an example in which the method is applicable to the terminal. The terminal may be the first terminal 120 or the second terminal 160 shown in FIG. 1. This embodiment includes the following steps:

201. A terminal starts an application, and displays an item assembly interface in the application.

The application may be any application that can support a virtual scene. In some implementations, the application may be a game client on the terminal, or may be an embedded applet built in an application client. For example, the application may be any one of an FPS game, a TPS game, a MOBA game, a VR application, a 3D map application, a military simulation program, or a multiplayer gunfight survival game. A type of the application is not specifically limited in this embodiment of this application.

In the foregoing process, the terminal may start the application in response to a start operation of the user on the application, where the start operation may be a touch operation of the user on an icon of the application on a desktop, or a start instruction that is for the application and that is inputted by the user into an intelligent voice assistant. The start instruction may include a voice instruction or a text instruction. A type of the start instruction is not specifically limited in this embodiment of this application.

In some embodiments, when the user sets an automatic start condition for the application, and the terminal may detect that the automatic start condition for the application is met, the operating system automatically starts the application. In some implementations, the automatic start condition may be that the application is periodically started, for example, the application is started at 8:00 pm every day; or the automatic start condition may be power-on automatic start. The automatic start condition for the application is not specifically limited in this embodiment of this application.

In the foregoing process, the item assembly interface may be used for providing a target item used by the user in the virtual scene. The target item is a virtual item that may assist the user in battling in a battle and is passively persistent. Therefore, the target item may be vividly referred to as a "skill chip". The target item may generally include three types: an offensive item, a defensive item, and an auxiliary item. The user may autonomously select a personalized target item from the item assembly interface in a favorite or habitual battling manner.

The target item may be assembled by the user before a game battle starts. Because the target item may be vividly referred to as a skill chip, a process of assembling the skill chip in the item assembly interface before the game battle starts may also be vividly referred to as adding a skill point to a perk tree. Certainly, in some embodiments, the target item may alternatively be assembled by the user after the game battle starts. An assembly timing of the target item is not specifically limited in this embodiment of this application.

202. In response to an assembly operation of a user on a perspective item in the item assembly interface, the terminal sets the perspective item to an assembled state.

The perspective item is used for displaying an occluded interactive item in a perspective manner, which is equivalent to expanding a capability that the user obtains information in a game battle, and therefore, the perspective item may be referred to as an "engineer skill chip". The occluded interactive item may be an interactive item in a friendship camp, or may be an interactive item in an enemy camp. An example in which the occluded interactive item is the interactive item in the enemy camp is used for description in this embodiment of this application, but this does not intend to constitute a specific limitation on a camp to which the occluded interactive item belongs.

In the foregoing process, assembly options of the perspective item and other target items may be displayed in the item assembly interface. In response to a click operation of the user on the assembly option of the perspective item, the terminal sets the perspective item to the assembled state. In this case, the terminal may display the perspective item in the assembled state in a display manner different from that of other target items, such as, by changing a background color of the assembly option of the perspective item, or by highlighting an outline of the assembly option of the perspective item. Similarly, if the user needs to assemble other target items in addition to the perspective item, the user may complete the assembly process for other target items by using a similar operation.

Figure 3:
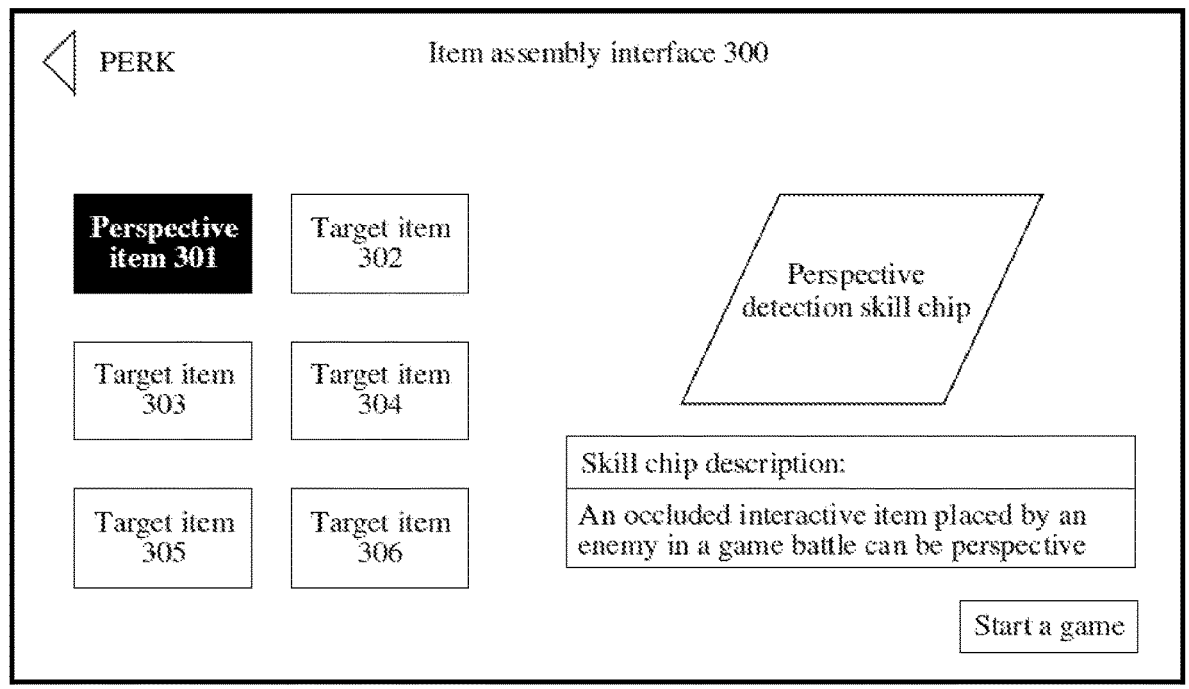
FIG. 3 is a schematic diagram of an item assembly interface according to an embodiment of this application.

FIG. 3 is a schematic diagram of an item assembly interface according to an embodiment of this application. Referring to FIG. 3, in the item assembly interface 300, a plurality of optional target items 301 to 306 may be provided. When the user selects a perspective item 301 from the target items, in the item assembly interface 300, the perspective item 301 may be displayed in a manner different from that of other unselected target items, for example, by adding a check mark to a display region of the perspective item 301, or certainly, by changing a background color of a display region of the perspective item 301 with a background color different from that of other target items.

The foregoing step 201 and step 202 show a possible implementation of assembling the perspective item, which means that the user autonomously selects to assemble the perspective item in the item assembly interface. In some embodiments, after the user controls a controlled virtual object to kill a hostile virtual object, if the hostile virtual object is assembled with a perspective item, an animation of dropping the perspective item may be further displayed in the virtual scene. When a distance between the controlled virtual object and the perspective item is less than a target threshold, a pickup option of the perspective item is displayed in the virtual scene. In response to a triggering operation of the user on the pickup option of the perspective item, the terminal controls the controlled virtual object to pick up and assemble the perspective item, so that a transfer and pickup process of the perspective item in the game battle may be added, and the interaction manner of the shooting game is enriched and made more interesting.

203. When the perspective item is in the assembled state, the terminal detects whether an occluded interactive item is included within a viewing angle range of a controlled virtual object in a virtual scene.

In some embodiments, the terminal may first detect whether the interactive item is included within the viewing angle range of the controlled virtual object. When the interactive item is included within the viewing angle range, the terminal next obtains a distance between the controlled virtual object and the interactive item. When the distance is less than a distance threshold, the terminal then detects whether a target object is included between the controlled virtual object and the interactive item. The target object is an object occluding the interactive item. When the target object is included between the controlled virtual object and the interactive item, the terminal determines that the occluded interactive item is included within the viewing angle range. Otherwise, provided that any of the foregoing conditions is not met, the terminal may determine that the occluded interactive item is not included within the viewing angle range. The distance threshold may be any value greater than or equal to 0. The value of the distance threshold is not specifically limited in this embodiment of this application.

In the foregoing process, the terminal may determine, by detecting the interactive item, the distance between the interactive item and the controlled virtual object, and the target object between the interactive item and the controlled virtual object, whether there is an interactive item occluded by the target object within the viewing angle range, so that an object that can be perspective by the perspective item (that is, the occluded interactive item) can be quickly and accurately positioned.

In some embodiments, after detecting that the interactive item is included within the viewing angle range, the terminal may further first detect whether a target object is included between the controlled virtual object and the interactive item. When the target object is included between the controlled virtual object and the interactive item, the terminal then detects whether a distance between the controlled virtual object and the interactive item is less than a distance threshold. When the distance is less than the distance threshold, the terminal determines that the occluded interactive item is included within the viewing angle range.

Otherwise, provided that any of the foregoing conditions is not met, the terminal determines that the occluded interactive item is not included within the viewing angle range.

In some embodiments, alternatively, the terminal may does not perform the step of detecting a distance between the controlled virtual object and the interactive item. That is, once it is detected that the interactive item is included within the viewing angle range, the terminal directly detects whether the target object is included between the controlled virtual object and the interactive item. When the target object is included between the controlled virtual object and the interactive item, the terminal determines that the occluded interactive item is included within the viewing angle range. Otherwise, provided that any of the foregoing conditions is not met, the terminal determines that the occluded interactive item is not included within the viewing angle range. In this case, this is equivalent to not specifically limiting a distance range that the perspective item can be perspective, thereby improving the perspective effect of the perspective item, and simplifying the procedure of the detection operation.

In the foregoing process, if the perspective item has been assembled before a game battle starts, the terminal performs the detection operation in the foregoing step 203 at a start moment of the game battle. If the perspective item has been assembled after the game battle starts, the terminal performs the detection operation in the foregoing step 203 at a completion movement of assembling the perspective item. An execution moment of the detection operation is not specifically limited in this embodiment of this application.

In other possible implementations, the perspective item has a specific item usage condition. That is, after the controlled virtual object needs to meet a preset condition, the perspective item is set to a usable state. The item usage condition may be pre-configured by a developer. For example, the item usage condition of the perspective item is set as follows: a kill streak reward reaching a preset score, a kill streak quantity reaching a preset quantity, or the like.

An example in which the kill streak quantity reaches the preset quantity is used to exemplarily describe the usage condition of the perspective item: After the user controls the controlled virtual object to assemble and complete the perspective item in the item assembly interface, the user controls the controlled virtual object to enter a battle. In this case, the perspective item is in an unavailable state. When a quantity of enemy virtual objects killed by the controlled virtual object reaches a preset quantity indicated by the item usage condition, for example, the preset quantity is 5, that is, a kill quantity reaches 5, it is determined that the item usage condition of the perspective item is met, and the usage state of the perspective item is set to an available state.

In some implementations, after the user enters the battle, an item presentation control corresponding to the perspective virtual item may be displayed in a battle interface. When the perspective item is in the unavailable state, the item presentation control corresponds to a gray color or a white color. If an item usage condition corresponding to the perspective item is met, the item presentation control is highlighted, to remind in time the user that the usage state of the item presentation control is changed.

204. When the occluded interactive item is included within the viewing angle range, the terminal detects whether the occluded interactive item meets a perspective condition, the perspective condition being used for representing a condition that the occluded interactive item is visible relative to the perspective item.

In some embodiments, the perspective condition may be that at least one component of a prefab of the occluded interactive item includes a target component whose material does not belongs to a semi-transparent material. That is, provided that there is any target component whose material does not belong to the semi-transparent material in the at least one component, the occluded interactive item is visible relative to the perspective item, and in other words, the occluded interactive item may be detected by the perspective item. Conversely, if materials of all components in the at least one component belong to the semi-transparent material, the occluded interactive item is invisible relative to the perspective item, and the occluded interactive item cannot be detected by the perspective item. The term "prefab" refers to pre-fabrication or pre-fabricated.

In the foregoing step 204, the terminal may obtain a renderer of the at least one component of the prefab of the occluded interactive item, store the renderer of the at least one component in an array, traverse the foregoing array, and determine whether a material of each renderer belongs to the semi-transparent material. If the materials of all the renderers belong to the semi-transparent material, it is determined that the occluded interactive item does not meet the perspective condition, which is equivalent to that a crispening special effect cannot be added to the occluded interactive item; otherwise, if there is a material of at least one renderer that does not belong to the semi-transparent material, it is determined that the occluded interactive item meets the perspective condition. In this case, a crispening special effect may be added to the occluded interactive item.

In some implementations, because there may be some components that belong to the semi-transparent material in some interactive items, while some components do not belong to the semi-transparent material, a component outline that does not belong to the semi-transparent material is obtained, and the crispening special effect is added to the component outline.

In some embodiments, the terminal may further set the perspective condition that all components of the prefab of the occluded interactive item are the foregoing target components. That is, the terminal determines that materials of all renderers corresponding to a specific interactive item do not belong to the semi-transparent material, and determines that the interactive item meets the perspective condition, so that the perspective condition of the interactive item can be more strictly controlled.

In some embodiments, the terminal may further set the perspective condition that the occluded interactive item hits any item in a pivotable list. That is, only the item located in the pivotable list can be detected by the perspective item, and an item out of the pivotable list cannot be detected by the perspective item, so that a richer and more interesting interaction manner can be provided. For example, the pivotable list may include kill streak reward items such as an anti-aircraft gun, a sentry gun, and an armed helicopter, or certainly, may include soldier skills and tactical items such as an explosion-proof apparatus, a laser trip mine, and a flying axe, or certainly, may include virtual vehicles such as a gunship. Content of the pivotable list is not specifically limited in this embodiment of this application.

The pivotable list may be preset by a developer, and the pivotable list is delivered and stored in the terminal, so that the terminal may subsequently determine according to the pivotable list whether the interactive item meets the perspective condition.

In other possible implementations, after the kill streak reward score of the controlled virtual object reaches a threshold, or the kill streak quantity of the controlled virtual object reaches a preset value, it may be set that types of the interactive items in the pivotable list are correspondingly unlocked. For example, the pivotable list includes 10 interactive items, and each interactive item corresponds to a preset score or a preset quantity. After the user enters a battle with perspective items assembled, a quantity of target virtual objects or enemy virtual objects that are continuously killed after the controlled virtual items enter the battle is recorded. If the quantity reaches the preset quantity corresponding to the interactive items, interactive items in the pivotable list are unlocked, and it is correspondingly determined that the interactive items meet the perspective condition.

A manner of unlocking the interactive items in the pivotable list is correspondingly increased, to improve a threshold and a permission that the interactive items meet the perspective condition, and avoid that the fairness of previous battles between different virtual objects is threatened after the perspective items are abused.

205. When the occluded interactive item meets the perspective condition, the terminal displays the occluded interactive item in a perspective manner in the virtual scene.

In some embodiments, when displaying the occluded interactive item in a perspective manner, the terminal may perform the following steps: displaying, by the terminal, an outline of the occluded interactive item on a target object of the virtual scene, the target object being an object occluding the interactive item. In the foregoing process, the outline of the occluded interactive item is displayed on the target object, which is equivalent to outlining an edge of the occluded interactive item on the target object. This may be vividly referred to as adding a "crispening special effect" to the occluded interactive item, so that the user can intuitively observe the occluded interactive item. In some embodiments, when displaying the outline of the occluded interactive item, the terminal may determine that a target component whose material does not belongs to the semi-transparent material in at least one component of a prefab of the occluded interactive item, set a display state of the target component to an occlusion culling state, and set a rendering manner of the target component to allowing a perspective effect. In the foregoing process, the display state and the rendering manner of the target component in the occluded interactive item are modified, to display the outline of the occluded interactive item on the target object, and accurately add the crispening special effect to the interactive item.

For example, the terminal obtains, by using the foregoing step 204, renderers of all components on the prefab of the occluded interactive item. When detecting the perspective condition, the terminal may obtain a renderer of the target component whose material does not belong to the semi-transparent material. In this case, the terminal sets a display state (passType) of the renderer to an occlusion culling state (ForwardPass), and sets a rendering manner of the renderer to allowing the perspective effect.

The foregoing setting manner for the renderer may be represented by using the following code:

```
renderer.passTypeMask |= 1 << (int)PassType.ForwardBase;
if (renderer as MeshRenderer)
{
    var mr = renderer as MeshRenderer;
    mr.ignorePerformRendering = disableOcclusionCulling;
}
```

```
else if (renderer as SkinnedMeshRenderer)
{
    var smr = renderer as SkinnedMeshRenderer;
    smr.ignorePerformRendering = disableOcclusionCulling;
}
else if (renderer as StaticBatchRenderer)
{
    var sbr = renderer as StaticBatchRenderer;
    sbr.ignorePerformRendering = disableOcclusionCulling;
}
```

Figure 4:
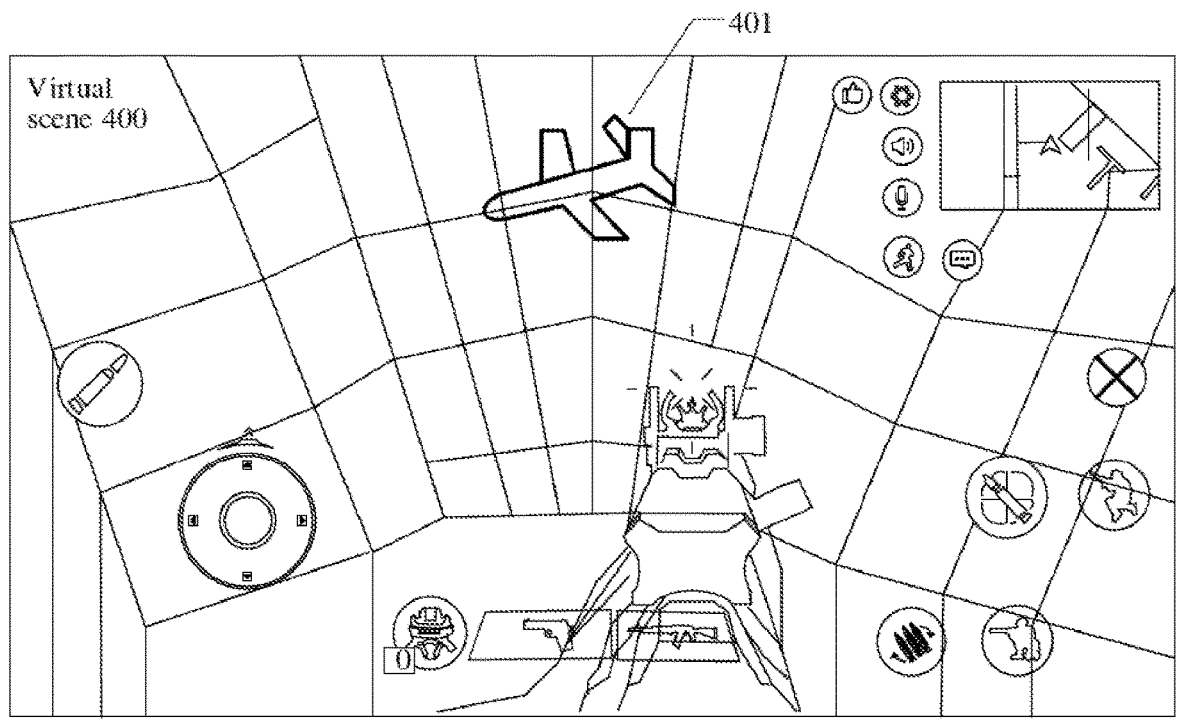
FIG. 4 is a schematic interface diagram of displaying an interactive item in a perspective manner according to an embodiment of this application.

FIG. 4 is a schematic interface diagram of displaying an interactive item in a perspective manner according to an embodiment of this application. Referring to FIG. 4, in a virtual scene 400, an example in which an occluded interactive item is a virtual armed helicopter is used for description. When a controlled virtual object has been assembled with a perspective item, because there is an occluded virtual armed helicopter 401 within a viewing angle range of the controlled virtual object, and the virtual armed helicopter 401 meets a perspective condition, an outline of the virtual armed helicopter 401 is displayed on a ceiling 402 (that is, a target object) occluding the virtual armed helicopter 401. In some implementations, because the virtual armed helicopter 401 has a relatively strong lethality, the virtual armed helicopter 401 may be used as a reward item for continuous killing to perform triggering distribution.

Figure 5:
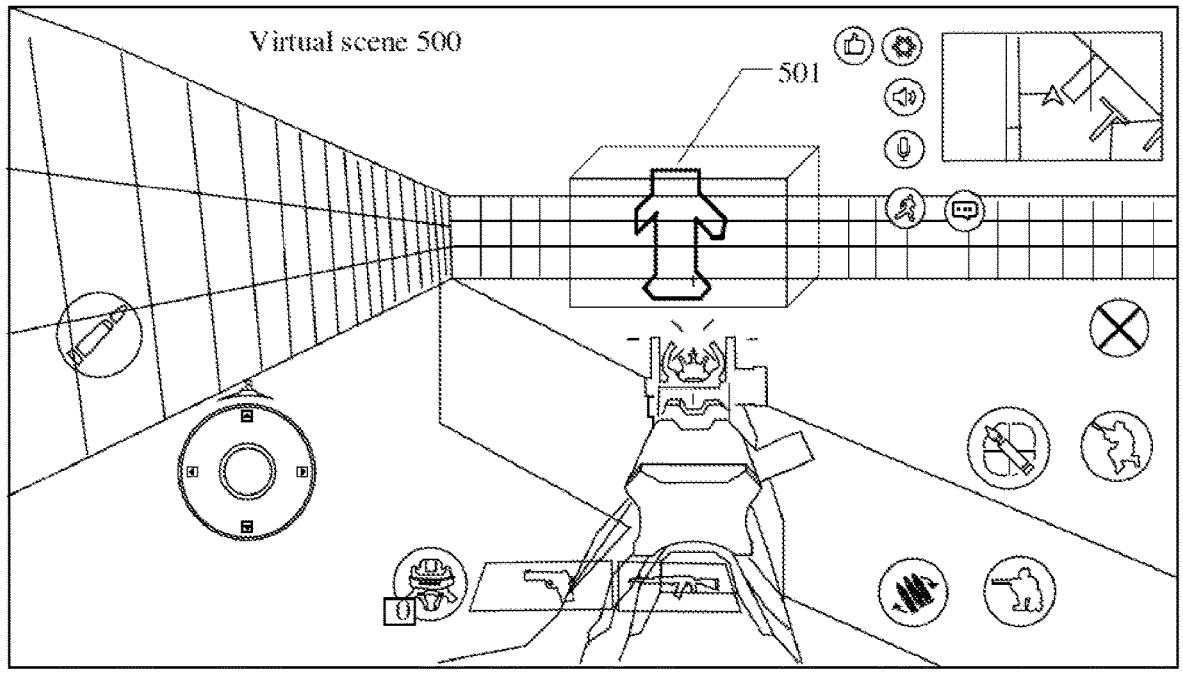
FIG. 5 is a schematic interface diagram of displaying an interactive item in a perspective manner according to an embodiment of this application.

FIG. 5 is a schematic interface diagram of displaying an interactive item in a perspective manner according to an embodiment of this application. Referring to FIG. 5, in a virtual scene 500, an example in which an occluded interactive item is an anti-aircraft gun is used for description. When a controlled virtual object has been assembled with a perspective item, because there is an occluded anti-aircraft gun 501 within a viewing angle range of the controlled virtual object, and the anti-aircraft gun 501 meets a perspective condition, an outline of the anti-aircraft gun 501 is displayed on a wall 502 (that is, a target object) occluding the anti-aircraft gun 501.

Figure 6:
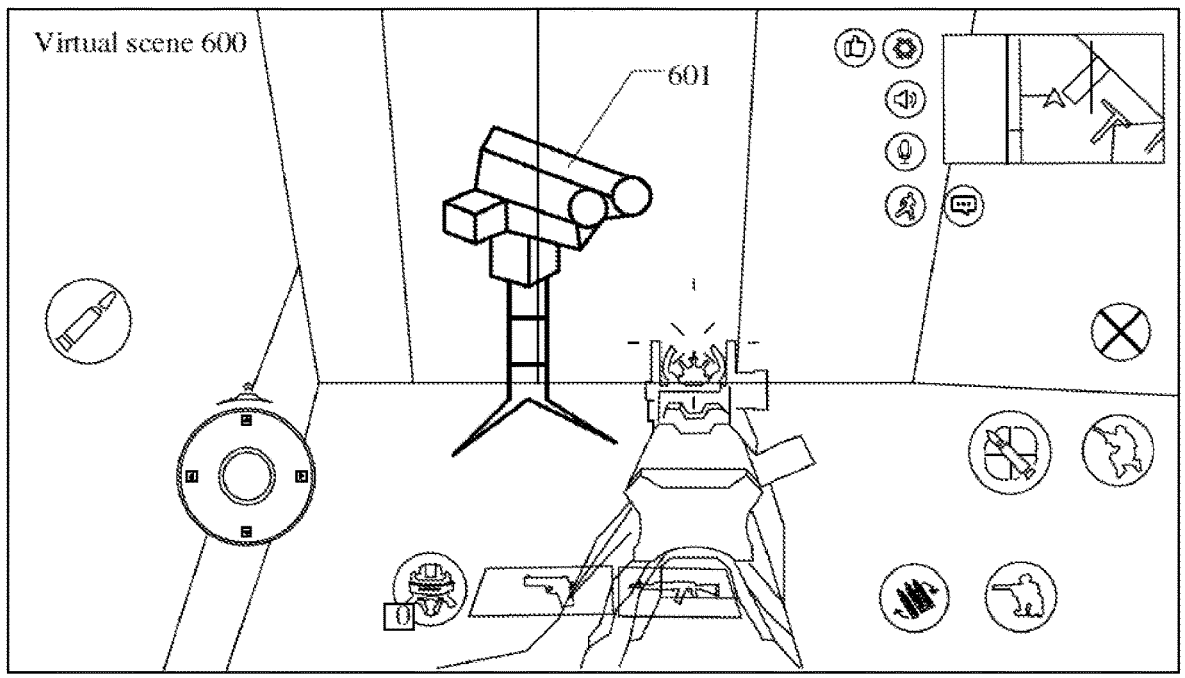
FIG. 6 is a schematic interface diagram of displaying an interactive item in a perspective manner according to an embodiment of this application.

FIG. 6 is a schematic interface diagram of displaying an interactive item in a perspective manner according to an embodiment of this application. Referring to FIG. 6, in a virtual scene 600, an example in which an occluded interactive item is a sentry gun is used for description. When a controlled virtual object has been assembled with a perspective item, because there is an occluded sentry gun 601 within a viewing angle range of the controlled virtual object, and the sentry gun 601 meets a perspective condition, an outline of the sentry gun 601 is displayed on a shading position 602 (that is, a target object) occluding the sentry gun 601.

Figure 7:
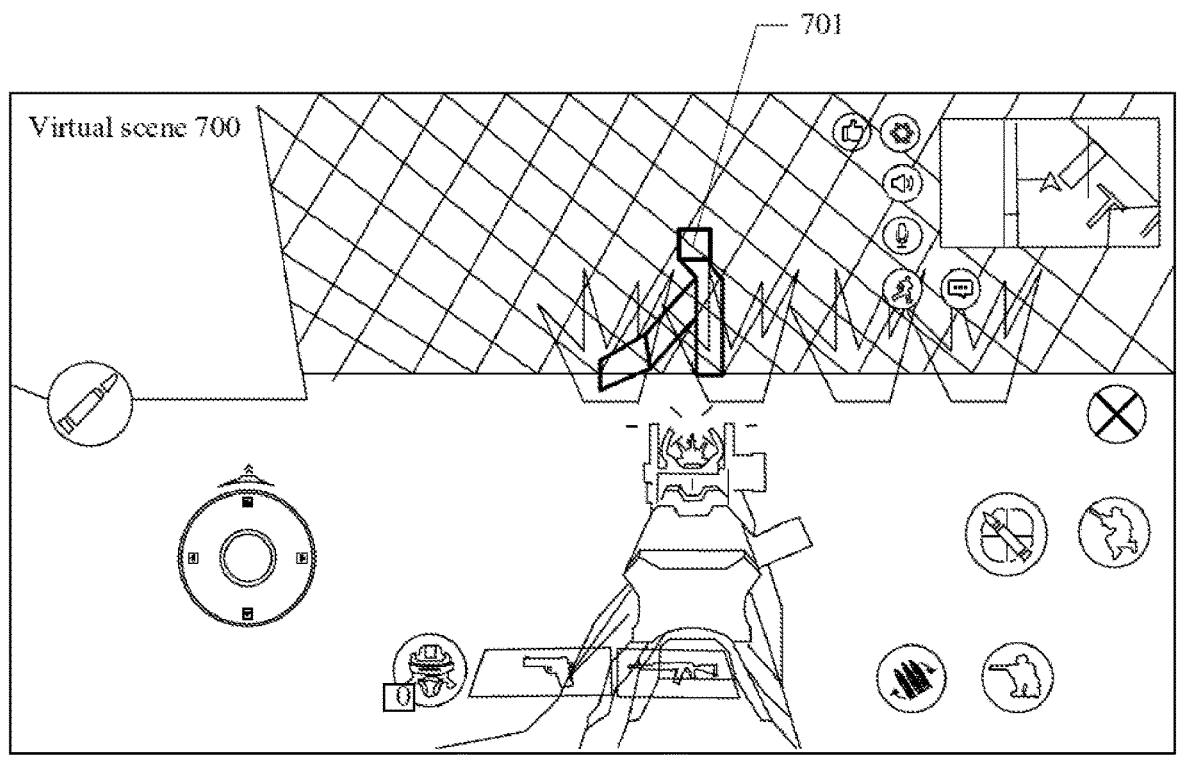
FIG. 7 is a schematic interface diagram of displaying an interactive item in a perspective manner according to an embodiment of this application.

FIG. 7 is a schematic interface diagram of displaying an interactive item in a perspective manner according to an embodiment of this application. Referring to FIG. 7, in a virtual scene 700, an example in which an occluded interactive item is an explosion-proof apparatus is used for description. When a controlled virtual object has been assembled with a perspective item, because there is an occluded explosion-proof apparatus 701 within a viewing angle range of the controlled virtual object, and the explosion-proof apparatus 701 meets a perspective condition, an outline of the explosion-proof apparatus 701 is displayed on grass 702 (that is, a target object) occluding the explosion-proof apparatus 701. The explosion-proof apparatus herein refers to an interactive item used for preventing explosion of thrown virtual weapons (such as grenades).

Figure 8:
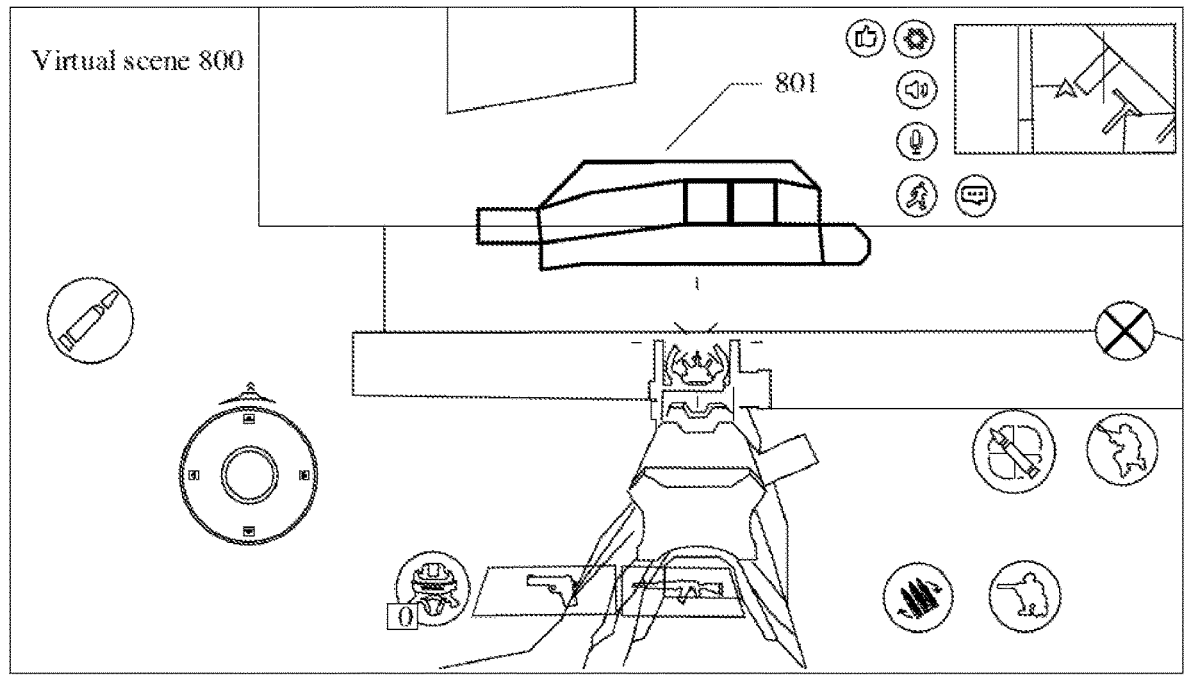
FIG. 8 is a schematic interface diagram of displaying an interactive item in a perspective manner according to an embodiment of this application.

FIG. 8 is a schematic interface diagram of displaying an interactive item in a perspective manner according to an embodiment of this application. Referring to FIG. 8, in a virtual scene 800, an example in which an occluded interactive item is a virtual vehicle is used for description. When a controlled virtual object has been assembled with a perspective item, because there is an occluded virtual vehicle 801 within a viewing angle range of the controlled virtual object, and the virtual vehicle 801 meets a perspective condition, an outline of the virtual vehicle 801 is displayed on a wall 802 (that is, a target object) occluding the virtual vehicle 801.

For a manner of displaying an outline of the occluded interactive item on a target object of the virtual scene, in a possible implementation, the outline of the occluded interactive item may be obtained, and a crispening special effect is added to the interactive item according to the outline, to display the outline of the occluded interactive item on the target object. In the foregoing process, for a process of adding a crispening special effect to the occluded interactive item, the terminal may finely configure at least one of display parameters of an edge color, a short-distance crispening width, a long-distance crispening width, a long-short transition distance, luminous intensity, a luminous range, or a crispening type of the crispening special effect, to configure various and colorful crispening special effects. When no personalized configuration is performed, all the display parameters may be set to default values.

For the edge color in the crispening special effect, the crispening special effect is displayed on the target object (that is, an opaque obstacle between the interactive item and the controlled virtual item). Therefore, to distinguish between the target object and the crispening special effect of the interactive item more easily, and enable the controlled virtual object (the user) to find the interactive item more easily, in a possible implementation, a target color of the target object may be obtained, and a color that is different from (or greatly varies with) the target color is used as the edge color of the crispening special effect, to avoid that the controlled virtual object ignores the crispening special effect because the target color and the edge color of the crispening special effect are relatively close, thereby affecting the function of the perspective item.

In some implementations, for the crispening width of the crispening special effect, the crispening width is set to be positively correlated with a distance between the interactive item and the controlled virtual object. That is, if the distance between the interactive item and the controlled virtual object is larger, to allow the user to detect the outline of the interactive item more clearly, the crispening width of the interactive item is set to be wider, thereby improving the clarity of the outline of the interactive item relative to the user. For example, if the distance between the interactive item and the controlled virtual object is 10 m, a relative value of the crispening width of the crispening special effect of the interactive item is set to 1. If the distance between the interactive item and the controlled virtual object is 50 m, the relative value of the crispening width of the crispening special effect of the interactive item is set to 10. A larger relative value of the crispening width indicates a wider actual crispening width.

In some implementations, if the crispening special effect has a luminous special effect, the luminous intensity may be correspondingly set to be positively correlated with the distance between the interactive item and the controlled virtual object. That is, a larger distance between the interactive item and the controlled virtual object indicates that the luminous intensity corresponding to the crispening special effect is set to be stronger. Conversely, a smaller distance between the interactive item and the controlled virtual object indicates that the luminous intensity corresponding to the crispening special effect is set to be weaker, so that when being far from the controlled virtual object, the interactive item still has better distinguishability and clarity relative to the virtual object, to further optimize the function of the perspective item.

In summary, a relative state, such as a relative distance or a state of an interval obstacle, between the controlled virtual item and the interactive item may be obtained, to correspondingly adjust display parameters of the crispening special effect of the interactive item. For example, the crispening width and the luminous intensity are adjusted according to the relative distance, to improve the clarity and distinguishability of the crispening special effect of the interactive item relative to the user, thereby further optimizing the function of the perspective item.

In some embodiments, when displaying the occluded interactive item in a perspective manner, the terminal may further perform the following steps: on a target object of the virtual scene, highlighting, by the terminal, a mapping region in which the occluded interactive item is mapped to the target object, the target object being an object occluding the interactive item. In the foregoing process, a mapping region of the occluded interactive item is highlighted on the target object, which is equivalent to highlighting a position of the occluded interactive item on the target object. This may be vividly referred to as adding a "sticker special effect" to the occluded interactive item, so that the user can intuitively observe the occluded interactive item.

In some implementations, in the foregoing process of highlighting a mapping region of the occluded interactive item, the terminal may add a graphic sticker to the mapping region, or may play a perspective animation in the mapping region, or may display text prompt information in the mapping region, or may display the occluded interactive item in the mapping region in a perspective holographic imaging manner. The manner of highlighting the mapping region is not limited in this embodiment of this application.

In some embodiments, the terminal may alternatively set different perspective display manners for different types of interactive items. For example, when the interactive item is a virtual vehicle, an outline of the virtual vehicle is displayed only on the target object. When the interactive item is a virtual weapon, a mapping region of the virtual weapon mapped on the target object is highlighted, to provide richer and more diverse perspective display manners.

206. When an interactive attribute value of the controlled virtual object or the occluded interactive item is lower than an attribute threshold, the terminal cancels display of the occluded interactive item in the virtual scene.

In some embodiments, the terminal may set an interactive attribute value for the interactive item or the controlled virtual object. The interactive attribute value may be a virtual mount of health, virtual integrity, a virtual health point (HP), or the like. When the interactive item or the controlled virtual object is attacked by a hostile virtual object, the terminal may deduct a specific value of the interactive attribute value of the interactive item or the controlled virtual object, until the interactive attribute value of the interactive item or the controlled virtual object is lower than an attribute threshold. It may be considered that the interactive item has been destroyed or the controlled virtual object has been killed. In this case, the terminal needs to turn off a perspective effect of the occluded interactive item, that is, cancels display of the occluded interactive item in the virtual scene. In some implementations, in the foregoing process of canceling display of the occluded interactive item, the terminal may set the renderer of the occluded interactive item to an inactive state.

In other possible implementations, when the terminal detects that the interactive item is far from a viewing angle range of the controlled virtual object, or there is no target object (obstacle) between the interactive item and the controlled virtual object due to a movement of the controlled virtual object, in this case, the terminal needs to turn off a perspective effect of the occluded interactive item, that is, cancels a crispening special effect of the interactive item.

In the method provided in the embodiments of this application, under a condition that a perspective item is in an assembled state, in a case of detecting that an occluded interactive item is included within a viewing angle range of a controlled virtual object in a virtual scene, and the occluded interactive item meets a perspective condition, the occluded interactive item may be displayed in the virtual scene in a perspective manner, so that the controlled virtual object may see the occluded interactive item through an obstacle, which extends a capability that the controlled virtual object obtains information, and makes a living environment of virtual objects with different interactive items more balanced, thereby improving attractiveness of a shooting game provided by the terminal, enriching an interaction manner of the shooting game, and optimizing an interaction effect of the shooting game. In addition, a player may determine a potential interactive item with threatening in a complex virtual environment, and plan an action path based on a position of the interactive item, to shorten a time required for the user to control the movement of the virtual object in the complex environment, and improve a movement speed of the virtual object in the virtual environment, thereby reducing a duration of a single game, and reducing processing pressure of the server while saving terminal power.

In all the foregoing optional technical solutions, any combination of the foregoing optional technical solutions may be used to form an optional embodiment of this application. Details are not described herein again.

Figure 9:
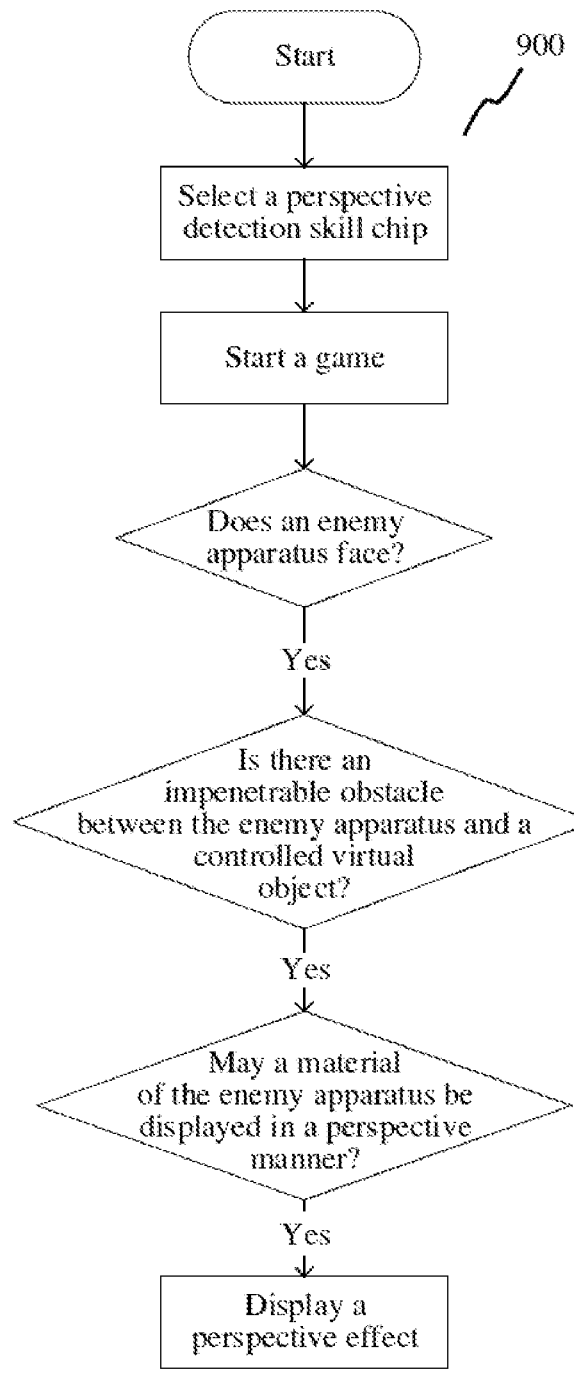
FIG. 9 is a principle flowchart of a method for displaying an interactive item according to an embodiment of this application.

By performing the method provided in the foregoing embodiments, when the controlled virtual object is assembled with the perspective item, the controlled virtual object may be "perspective" to the occluded interactive item, thereby enriching the interaction manner of the shooting game. Referring to FIG. 9, FIG. 9 is a principle flowchart of a method for displaying an interactive item according to an embodiment of this application. An example in which the perspective item is a perspective detection skill chip is used for description. The flowchart 900 shows the following steps:

Step 1. A user selects a perspective detection skill chip outside a game.

In the foregoing process, the user may select the perspective detection skill chip from a perk chip skill page.

Step 2: Start the game.

After the user finishes assembling the perspective detection skill chip for the controlled virtual object outside the game, correspondingly, the controlled virtual object carries the perspective detection skill chip after entering the game.

Step 3: Determine whether the controlled virtual object (the virtual object currently controlled by the user) faces an enemy apparatus, and perform step 4 if the controlled virtual object faces the enemy apparatus; otherwise, end this process.

That is, the terminal determines whether an interactive item is included within a viewing angle range of the controlled virtual object.

In some embodiments, the terminal further needs to determine whether a distance between the controlled virtual object and the interactive item is less than a distance threshold. That is, the distance between the controlled virtual object and the interactive item cannot be excessively large. Otherwise, the interactive item cannot be perspective.

In some implementations, it further needs to be ensured that an interactive attribute value of the controlled virtual object is higher than an attribute threshold. That is, it is determined that the controlled virtual object is in a survival state.

Step 4. Determine whether there is an impenetrable obstacle (that is, a target object) between the enemy apparatus and the controlled virtual object, and perform step 5 if there is the impenetrable obstacle; otherwise, end this process.

Step 5. Determine whether a material of the enemy apparatus may be displayed in a perspective manner, and perform step 6 if the material may be displayed in a perspective manner; otherwise, end this process.

Step 6. Display a perspective effect for the enemy apparatus.

In this embodiment of this application, the user may detect a position of the enemy apparatus in a perspective manner by using the perspective detection skill chip, to see through an enemy's combat layout, and select an own attack manner to avoid an enemy's cutting edge, so that an enemy's combat strategy is collapsed of itself, a survival environment of a disadvantaged side in an unbalanced battle can be improved, a more interesting gameplay is provided for the entire shooting game, and a better gaming experience is brought to the user. In addition, the player may determine a threatening enemy apparatus that may exist in a virtual environment, and adopts a corresponding battle strategy and a movement strategy based on a position of the enemy apparatus, to improve enthusiasm for participating in the battle by the user, avoid a relatively long duration of a single game because the user adopts a squatting strategy, and further reduce processing pressure of the server.

Figure 10:
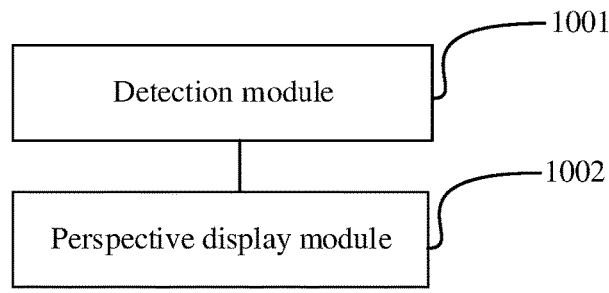
FIG. 10 is a schematic structural diagram of an apparatus for displaying an interactive item according to an embodiment of this application.

FIG. 10 is a schematic structural diagram of an apparatus for displaying an interactive item according to an embodiment of this application. Referring to FIG. 10, the apparatus includes:

a detection module 1001, configured to, when a perspective item is in an assembled state, detect whether an occluded interactive item is included within a viewing angle range of a controlled virtual object in a virtual scene, the perspective item being used for displaying the occluded interactive item in a perspective manner, the detection module 1001 being further configured to, when the occluded interactive item is included within the viewing angle range, detect whether the occluded interactive item meets a perspective condition, the perspective condition being used for representing a condition that the occluded interactive item is visible relative to the perspective item; and a perspective display module 1002, configured to, when the occluded interactive item meets the perspective condition, display the occluded interactive item in a perspective manner in the virtual scene.

In the apparatus provided in the embodiments of this application, under a condition that a perspective item is in an assembled state, in a case of detecting that an occluded interactive item is included within a viewing angle range of a controlled virtual object in a virtual scene, and the occluded interactive item meets a perspective condition, the occluded interactive item may be displayed in the virtual scene in a perspective manner, so that the controlled virtual object may see the occluded interactive item through an obstacle, which extends a capability that the controlled virtual object obtains information, and makes a living environment of virtual objects with different interactive items more balanced, thereby improving attractiveness of a shooting game provided by the terminal, enriching an interaction manner of the shooting game, and optimizing an interaction effect of the shooting game. In addition, a player may determine a threatening interactive item that may exist in a virtual environment, and adopts a corresponding battle strategy based on a position of the interactive item, to cause the player to control the virtual object to actively participate in a battle while improving a survival rate of the virtual object, so that an item usage rate of the controlled virtual object is improved, thereby effectively controlling a duration of a single game, and further reducing processing pressure of a server. In addition, the player may adopt a corresponding movement strategy according to a position of the interactive item, to shorten a time required for the player to control the virtual object to move in a complex environment, and further reduce a duration of the single game.

In a possible implementation, based on the apparatus composition in FIG. 10, the perspective display module 1002 includes:

an outline display unit, configured to display an outline of the occluded interactive item on a target object of the virtual scene, the target object being an object occluding the interactive item.

In a possible implementation, the outline display unit is configured to:

in at least one component of a prefab of the occluded interactive item, determine a target component whose material does not belong to a semi-transparent material; and set a display state of the target component to an occlusion culling state, and set a rendering manner of the target component to allow a perspective effect.

In a possible implementation, based on the apparatus composition in FIG. 10, the perspective display module 1002 is configured to:

on a target object of the virtual scene, highlight a mapping region in which the occluded interactive item is mapped to the target object, the target object being an object occluding the interactive item.

In a possible implementation, the perspective condition is that at least one component of a prefab of the occluded interactive item includes a target component whose material does not belongs to a semi-transparent material.

In a possible implementation, the detection module 1001 is configured to:

detect whether an interactive item is included within the viewing angle range;

when the interactive item is included within the viewing angle range, obtain a distance between the controlled virtual object and the interactive item;

when the distance is less than a distance threshold, detect whether a target object is included between the controlled virtual object and the interactive item, the target object being an object occluding the interactive item; and when the target object is included between the controlled virtual object and the interactive item, determine that the occluded interactive item is included within the viewing angle range; or otherwise, determine that the occluded interactive item is not included within the viewing angle range.

In a possible implementation, based on the apparatus composition of FIG. 10, the apparatus further includes:

a display canceling module, configured to, when an interactive attribute value of the controlled virtual object or the occluded interactive item is lower than an attribute threshold, cancel display of the occluded interactive item in the virtual scene.

In a possible implementation, the outline display unit is further configured to:

add a crispening special effect for the occluded interactive item on the target object of the virtual scene according to the outline of the occluded interactive item, the crispening special effect being corresponding to at least one display parameter of an edge color, a crispening width, luminous intensity, a luminous range, and a crispening type.

In all the foregoing optional technical solutions, any combination of the foregoing optional technical solutions may be used to form an optional embodiment of this application. Details are not described herein again.

When the apparatus for displaying an interactive item provided in the foregoing embodiments displays the interactive item, the division of the foregoing functional modules is merely an example for description. In actual application, the functions may be assigned to and completed by different functional modules according to requirements, that is, an internal structure of the terminal is divided into different functional modules, to complete all or some of the functions described above. In addition, embodiments of the apparatus for displaying an interactive item and the method for displaying an interactive item provided in the foregoing embodiments belong to the same conception. For a specific implementation process, refer to the embodiments of the method for displaying an interactive item, and details are not described herein again.

Figure 11:
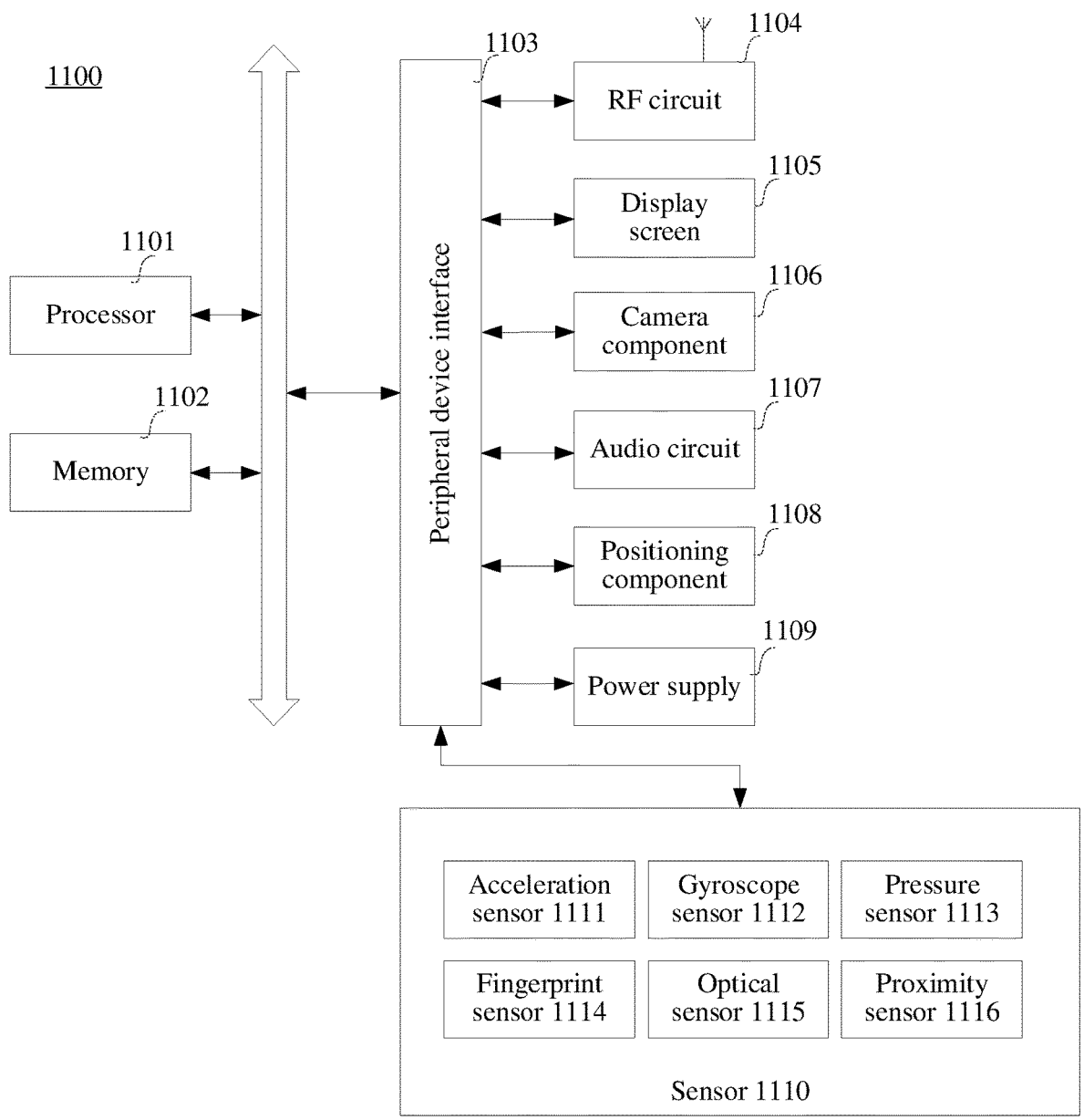
FIG. 11 is a schematic structural diagram of a terminal according to an embodiment of this application.

FIG. 11 is a schematic structural diagram of a terminal according to an embodiment of this application. The terminal 1100 may be a smartphone, a tablet computer, an MP3 player, an MP4 player, a notebook computer, or a desktop computer. The terminal 1100 may also be referred to other names such as a user device, or a portable terminal, a laptop computer, or a desktop terminal.

Generally, the terminal 1100 includes a processor 1101 and a memory 1102.

The processor 1101 may include one or more processing cores, for example, a 4-core processor or an 8-core processor. The processor 1101 may be implemented in at least one hardware form of digital signal processing (DSP), a field programmable gate array (FPGA), and a programmable logic array (PLA). The processor 1101 may alternatively include a main processor and a coprocessor. The main processor is configured to process data in an active state, also referred to as a central processing unit (CPU). The coprocessor is a low-power processor configured to process data in a standby state. In some embodiments, the processor 1101 may be integrated with a graphics processing unit (GPU). The GPU is configured to render and draw content that needs to be displayed on a display screen. In some embodiments, the processor 1101 may further include an AI processor. The AI processor is configured to process computing operations related to machine learning.

The memory 1102 may include one or more computer-readable storage medium. The computer-readable storage medium tangible may be non-transient. The memory 1102 may further include a high-speed random access memory (RAM) and a non-volatile memory, for example, one or more disk storage devices or flash memory devices. In some embodiments, a non-transitory computer-readable storage medium in the memory 1102 is configured to store at least one instruction, the at least one instruction being configured to be executed by the processor 1101 to implement the method for displaying an interactive item provided in the embodiments of this application.

In some embodiments, the terminal 1100 may optionally include a peripheral device interface 1103 and at least one peripheral device. The processor 1101, the memory 1102, and the peripheral device interface 1103 may be connected by using a bus or a signal line. The peripheral devices may be connected to the peripheral device interface 1103 by using the bus, the signal line, or a circuit board. Specifically, the peripheral device includes at least one of a radio frequency (RF) circuit 1104, a display screen 1105, a camera component 1106, an audio circuit 1107, a positioning component 1108, and a power supply 1109.

The peripheral device interface 1103 may be configured to connect at least one peripheral device related to input/output (I/O) to the processor 1101 and the memory 1102. In some embodiments, the processor 1101, the memory 1102, and the peripheral device interface 1103 are integrated on a same chip or a same circuit board. In some other embodiments, any one or two of the processor 1101, the memory 1102, and the peripheral device interface 1103 may be implemented on a separate chip or circuit board. This is not limited in this embodiment.

The RF circuit 1104 is configured to receive and transmit a RF signal, also referred to as an electromagnetic signal. The RF circuit 1104 communicates with a communication network and other communication devices through the electromagnetic signal. The radio frequency circuit 1104 may convert an electric signal into an electromagnetic signal for transmission, or convert a received electromagnetic signal into an electric signal. In some implementations, the RF circuit 1104 includes: an antenna system, an RF transceiver, one or more amplifiers, a tuner, an oscillator, a digital signal processor, a codec chip set, a subscriber identity module card, and the like. The RF circuit 1104 may communicate with another terminal by using at least one wireless communication protocol. The wireless communication protocol includes, but is not limited to: a world wide web, a metropolitan area network, an intranet, generations of mobile communication networks (2G, 3G, 4G, and 5G), a wireless local area network, and/or a wireless fidelity (Wi-Fi) network. In some embodiments, the RF circuit 1104 may further include a circuit related to near field communication (NFC), which is not limited in this application.

The display screen 1105 is configured to display a user interface (UI). The UI may include a graphic, a text, an icon, a video, and any combination thereof. When the display screen 1105 is a touchscreen, the display screen 1105 is further capable of acquiring a touch signal on or above a surface of the display screen 1105. The touch signal may be inputted into the processor 1101 as a control signal for processing. In this case, the display screen 1105 may be further configured to provide a virtual button and/or a virtual keyboard, also referred to as a soft button and/or a soft keyboard. In some embodiments, there may be one display screen 1105, disposed on a front panel of the terminal 1100. In some other embodiments, there may be at least two display screens 1105, disposed on different surfaces of the terminal 1100 respectively or in a folded design. In some other embodiments, the display screen 1105 may be a flexible display screen disposed on a curved surface or a folded surface of the terminal 1100. Even, the display screen 1105 may be further set in a non-rectangular irregular pattern, that is, a special-shaped screen. The display screen 1105 may be manufactured by using a material such as a liquid crystal display (LCD), an organic light-emitting diode (OLED), or the like.

The camera component 1106 is configured to capture images or videos. In some implementations, the camera component 1106 includes a front-facing camera and a rear-facing camera. Generally, the front-facing camera is disposed on the front panel of the terminal, and the rear-facing camera is disposed on a back face of the terminal. In some embodiments, there are at least two rear-facing cameras, which are respectively any one of a main camera, a depth-of-field camera, a wide-angle camera, and a telephoto camera, to achieve background blurring function through fusion of the main camera and the depth-of-field camera, panoramic photographing and VR photographing function through fusion of the main camera and the wide-angle camera, or other fusion photographing functions. In some embodiments, the camera component 1106 may further include a flash. The flash may be a monochrome temperature flash, or may be a double color temperature flash. The double color temperature flash refers to a combination of a warm flash and a cold flash, and may be used for light compensation at different color temperatures.

The audio circuit 1107 may include a microphone and a speaker. The microphone is configured to: acquire sound waves of a user and an environment, and convert the sound waves into the electric signals to be inputted to the processor 1101 for processing, or to be inputted to the radio frequency circuit 1104 for implementing speech communication. For stereo acquisition or noise reduction, there may be a plurality of microphones, disposed at different portions of the terminal 1100 respectively. The microphone may be further an array microphone or an omnidirectional acquisition microphone. The speaker is configured to convert the electric signals from the processor 1101 or the radio frequency circuit 1104 into the sound waves. The speaker may be a conventional film speaker, or may be a piezoelectric ceramic speaker. When the speaker is the piezoelectric ceramic speaker, electric signals not only can be converted into sound waves that can be heard by human, but also can be converted into sound waves that cannot be heard by human for ranging and the like. In some embodiments, the audio circuit 1107 may also include an earphone jack.

The positioning component 1108 is configured to position a current geographic location of the terminal 1100, to implement a navigation or a location based service (LBS). The positioning component 1108 may be a positioning component based on the Global Positioning System (GPS) of the United States, the BeiDou System of China, the GLONASS System of Russia, or the GALILEO System of the European Union.

The power source 1109 is configured to supply power for components in the terminal 1100. The power supply 1109 may be an alternating current, a direct current, a primary battery, or a rechargeable battery. When the power supply 1109 includes the rechargeable battery, the rechargeable battery may be a wired rechargeable battery or a wireless rechargeable battery. The wired charging battery is a battery charged through a wired line, and the wireless charging battery is a battery charged through a wireless coil. The rechargeable battery may be further configured to support a quick charge technology.

In some embodiments, the terminal 1100 may further include one or more sensors 1110. The one or more sensors 1110 include, but are not limited to, an acceleration sensor 1111, a gyroscope sensor 1112, a pressure sensor 1113, a fingerprint sensor 1114, an optical sensor 1115, and a proximity sensor 1116.

The acceleration sensor 1111 may detect a magnitude of acceleration on three coordinate axes of a coordinate system established with the terminal 1100. For example, the acceleration sensor 1111 may be configured to detect components of gravity acceleration on the three coordinate axes. The processor 1101 may control, according to a gravity acceleration signal acquired by the acceleration sensor 1111, the display screen 1105 to display the user interface in a frame view or a portrait view. The acceleration sensor 1111 may be further configured to acquire game or user motion data.

The gyroscope sensor 1112 may detect a body direction and a rotation angle of the terminal 1100, and the gyroscope sensor 1112 may work with the acceleration sensor 1111 to acquire a 3D action performed by the user on the terminal 1100. The processor 1101 may implement the following functions according to data acquired by the gyroscope sensor 1112: motion sensing (for example, the UI is changed according to a tilt operation of a user), image stabilization during shooting, game control, and inertial navigation.

The pressure sensor 1113 may be disposed at a side frame of the terminal 1100 and/or a lower layer of the display screen 1105. When the pressure sensor 1113 is disposed at the side frame of the terminal 1100, a holding signal of the user on the terminal 1100 may be detected. The processor 1101 performs left and right hand recognition or a quick operation according to the holding signal acquired by the pressure sensor 1113. When the pressure sensor 1113 is disposed on the low layer of the display screen 1105, the processor 1101 controls, according to a pressure operation of the user on the display screen 1105, an operable control on the UI. The operable control includes at least one of a button control, a scroll-bar control, an icon control, and a menu control.

The fingerprint sensor 1114 is configured to acquire a user's fingerprint. The processor 1101 identifies a user's identity according to the fingerprint acquired by the fingerprint sensor 1114, or identifies the user's identity according to the fingerprint acquired by the fingerprint sensor 1114. When the user's identity is identified as a trusted identity, the processor 1101 authorizes the user to perform a related sensitive operation. The sensitive operation includes unlocking a screen, viewing encrypted information, downloading software, payment, changing settings, and the like. The fingerprint sensor 1114 may be disposed on a front face, a back face, or a side face of the terminal 1100. When a physical button or a vendor logo is disposed on the terminal 1100, the fingerprint sensor 1114 may be integrated together with the physical button or the vendor logo.

The optical sensor 1115 is configured to acquire ambient light intensity. In an embodiment, the processor 1101 may control display luminance of the display screen 1105 according to the ambient light intensity acquired by the optical sensor 1115. Specifically, when the ambient light intensity is relatively high, the display brightness of the display screen 1105 is increased; and when the ambient light intensity is relatively low, the display brightness of the display screen 1105 is reduced. In another embodiment, the processor 1101 may further dynamically adjust a camera parameter of the camera component 1106 according to the ambient light intensity acquired by the optical sensor 1115.

The proximity sensor 1116, also referred to as a distance sensor, is generally disposed on the front panel of the terminal 1100. The proximity sensor 1116 is configured to collect a distance between the user and the front surface of the terminal 1100. In an embodiment, when the proximity sensor 1116 detects that the distance between the user and the front surface of the terminal 1100 gradually becomes small, the display screen 1105 is controlled by the processor 1101 to switch from a screen-on state to a screen-off state; and when the proximity sensor 1116 detects that the distance between the user and the front surface of the terminal 1100 gradually increases, the display screen 1105 is controlled by the processor 1101 to switch from a screen-off state to a screen-on state.

A person skilled in the art may understand that the structure shown in FIG. 11 does not constitute a limitation on the terminal 1100, and the terminal may include more components or fewer components than those shown in the figure, or some components may be combined, or a different component deployment may be used.

In an exemplary embodiment, a computer-readable storage medium, for example, a memory including at least one piece of program code is further provided. The at least one piece of program code may be executed by a processor in a terminal to implement the method for displaying an interactive item in the foregoing embodiments. For example, the computer-readable storage medium may be a read-only memory (ROM), a RAM, a compact disc read-only memory (CD-ROM), a magnetic tape, a floppy disk, an optical data storage device, or the like.

An embodiment of this application further provides a computer program product or a computer program. The computer program product or the computer program includes computer instructions, and the computer instructions are stored in a computer-readable storage medium. A processor of a computer device reads the computer instructions from the computer-readable storage medium, and executes the computer instructions, so that the computer device performs the method for displaying an interactive item provided in the possible implementations in the foregoing aspects.

A person of ordinary skill in the art may understand that all or some of the steps of the foregoing embodiments may be implemented by hardware, or may be implemented a program instructing related hardware. The program may be stored in a computer-readable storage medium. The storage medium may be: a ROM, a magnetic disk, or an optical disc.

The foregoing descriptions are merely optional embodiments of this application, but are not intended to limit this application. Any modification, equivalent replacement, or improvement made within the spirit and principle of this application falls within the protection scope of this application.

What is claimed is:

1. A method for displaying an interactive item on an electronic display screen associated with a terminal, the method being performed by a processor of the terminal and comprising:
   when a perspective item is in an assembled state, detecting whether an occluded interactive item is comprised within a viewing angle range of a controlled virtual object in a virtual scene, the perspective item being used for visually revealing the occluded interactive item in a perspective manner, the occluded interactive item would otherwise be undetectable without the perspective item;
   when the occluded interactive item is comprised within the viewing angle range, detecting whether the occluded interactive item meets a perspective condition, the perspective condition representing that the occluded interactive item is visible relative to the perspective item; and when the occluded interactive item meets the perspective condition, visually revealing the occluded interactive item in a perspective manner in the virtual scene.

2. The method according to claim 1, wherein visually revealing the occluded interactive item in the perspective manner in the virtual scene comprises:

displaying an outline of the occluded interactive item on a target object of the virtual scene, the target object being an object occluding the interactive item.

3. The method according to claim 2, wherein displaying the outline of the occluded interactive item comprises:

among at least one component of the occluded interactive item, determining a target component of the occluded interactive item whose material is not semi-transparent; and setting a display state of the target component to an occlusion culling state, and setting a rendering manner of the target component to allow a perspective effect.

4. The method according to claim 1, wherein visually revealing the occluded interactive item in the perspective manner in the virtual scene comprises:

on a target object of the virtual scene, highlighting a mapping region in which the occluded interactive item is mapped to the target object, the target object being an object occluding the interactive item.

5. The method according to claim 1, wherein the perspective condition comprises that at least one component of the occluded interactive item comprises a target component whose material does not belongs to a semi-transparent material.

6. The method according to claim 1, wherein detecting whether the occluded interactive item is comprised within the viewing angle range of the controlled virtual object in the virtual scene comprises:

detecting whether an interactive item is within the viewing angle range;

when the interactive item is within the viewing angle range, obtaining a distance between the controlled virtual object and the interactive item;

when the distance is less than a distance threshold, detecting whether a target object is between the controlled virtual object and the interactive item, the target object being an object occluding the interactive item; and when the target object is detected between the controlled virtual object and the interactive item, determining that the occluded interactive item is within the viewing angle range; or otherwise, determining that the occluded interactive item is not within the viewing angle range.

7. The method according to claim 1, wherein after visually revealing the occluded interactive item in the perspective manner in the virtual scene, the method further comprises:

when an interactive attribute value of the controlled virtual object or the occluded interactive item is lower than an attribute threshold, canceling display of the occluded interactive item in the virtual scene.

8. The method according to claim 2, wherein visually revealing the outline of the occluded interactive item on the target object of the virtual scene further comprises:

adding a special highlighting effect for the occluded interactive item on the target object of the virtual scene according to the outline of the occluded interactive item, the special highlighting effect being corresponding to at least one display parameter of an edge color, a highlighting width, luminous intensity, a luminous range, and a highlighting type.

9. A device for displaying an interactive item, comprising a memory for storing computer instructions and a processor, wherein the processor, when executing the computer instructions, is configured to:

when a perspective item is in an assembled state, detect whether an occluded interactive item is comprised within a viewing angle range of a controlled virtual object in a virtual scene, the perspective item being used for visually revealing the occluded interactive item in a perspective manner, the occluded interactive item would otherwise be undetectable without the perspective item;

when the occluded interactive item is comprised within the viewing angle range, detect whether the occluded interactive item meets a perspective condition, the perspective condition representing that the occluded interactive item is visible relative to the perspective item; and when the occluded interactive item meets the perspective condition, visually reveal the occluded interactive item in a perspective manner in the virtual scene.

10. The device according to claim 9, wherein the to visually reveal the occluded interactive item in a perspective manner in the virtual scene comprises:

display an outline of the occluded interactive item on a target object of the virtual scene, the target object being an object occluding the interactive item.

11. The device according to claim 10, wherein the processor is further configured to execute the computer instructions to:

in at least one component of the occluded interactive item, determine a target component of the occluded interactive item whose material is not semi-transparent; and set a display state of the target component to an occlusion culling state, and set a rendering manner of the target component to allow a perspective effect.

12. The device according to claim 9, wherein to visually reveal the occluded interactive item in a perspective manner in the virtual scene further comprises:

on a target object of the virtual scene, highlight a mapping region in which the occluded interactive item is mapped to the target object, the target object being an object occluding the interactive item.

13. The device according to claim 9, wherein the perspective condition comprises that at least one component of the occluded interactive item comprises a target component whose material does not belongs to a semi-transparent material.

14. The device according to claim 9, wherein to detect whether an occluded interactive item is comprised within a viewing angle range of a controlled virtual object in a virtual scene comprises:

detect whether an interactive item is within the viewing angle range;

when the interactive item is within the viewing angle range, obtain a distance between the controlled virtual object and the interactive item;

when the distance is less than a distance threshold, detect whether a target object is between the controlled virtual object and the interactive item, the target object being an object occluding the interactive item; and when the target object is detected between the controlled virtual object and the interactive item, determine that the occluded interactive item is within the viewing angle range; or otherwise, determine that the occluded interactive item is not within the viewing angle range.

15. A non-transitory computer-readable storage medium for storing a computer program, the computer program, when executed by a processor of an electronic device, causes the electronic device to:

when a perspective item is in an assembled state, detect whether an occluded interactive item is comprised within a viewing angle range of a controlled virtual object in a virtual scene, the perspective item being used for visually revealing the occluded interactive item in a perspective manner, the occluded interactive item would otherwise be undetectable without the perspective item;

when the occluded interactive item is comprised within the viewing angle range, detect whether the occluded interactive item meets a perspective condition, the perspective condition representing that the occluded interactive item is visible relative to the perspective item; and when the occluded interactive item meets the perspective condition, visually reveal the occluded interactive item in a perspective manner in the virtual scene.

16. The non-transitory computer-readable storage medium according to claim 15, wherein to visually reveal the occluded interactive item in a perspective manner in the virtual scene comprises:

display an outline of the occluded interactive item on a target object of the virtual scene, the target object being an object occluding the interactive item.

17. The non-transitory computer-readable storage medium according to claim 16, when executed by the processor, further causes the electronic device to:

in at least one component of the occluded interactive item, determine a target component of the occluded interactive item whose material is not semi-transparent; and set a display state of the target component to an occlusion culling state, and set a rendering manner of the target component to allow a perspective effect.

18. The non-transitory computer-readable storage medium according to claim 15, wherein to visually reveal the occluded interactive item in a perspective manner in the virtual scene further comprises:

on a target object of the virtual scene, highlight a mapping region in which the occluded interactive item is mapped to the target object, the target object being an object occluding the interactive item.

19. The non-transitory computer-readable storage medium according to claim 9, wherein the perspective condition comprises that at least one component of the occluded interactive item comprises a target component whose material does not belongs to a semi-transparent material.

20. The non-transitory computer-readable storage medium according to claim 9, wherein to detect whether an occluded interactive item is comprised within a viewing angle range of a controlled virtual object in a virtual scene comprises:

detect whether an interactive item is within the viewing angle range;

when the interactive item is within the viewing angle range, obtain a distance between the controlled virtual object and the interactive item;

when the distance is less than a distance threshold, detect whether a target object is between the controlled virtual object and the interactive item, the target object being an object occluding the interactive item; and when the target object is detected between the controlled virtual object and the interactive item, determine that the occluded interactive item is within the viewing angle range; or otherwise, determine that the occluded interactive item is not within the viewing angle range.

* * * * *